US012629296B2

(12) United States Patent
Plass

(10) Patent No.: US 12,629,296 B2
(45) Date of Patent: May 19, 2026

(54) MODULAR RESCUE STRETCHER

(71) Applicant: André Plass, Wollerau (CH)

(72) Inventor: André Plass, Wollerau (CH)

( * ) Notice: Subject to any disclaimer, the term of this patent is extended or adjusted under 35 U.S.C. 154(b) by 60 days.

(21) Appl. No.: 18/711,935

(22) PCT Filed: Nov. 17, 2022

(86) PCT No.: PCT/EP2022/082243
§ 371 (c)(1),
(2) Date: May 21, 2024

(87) PCT Pub. No.: WO2023/089013
PCT Pub. Date: May 25, 2023

(65) Prior Publication Data
US 2025/0000723 A1 Jan. 2, 2025

(30) Foreign Application Priority Data
Nov. 22, 2021 (CH) ................................ 70586/2021

(51) Int. Cl.
*A61G 1/013* (2006.01)
*A61G 1/00* (2006.01)

(52) U.S. Cl.
CPC ............... *A61G 1/013* (2013.01); *A61G 1/00* (2013.01)

(58) Field of Classification Search
CPC ................................ A61G 1/013; A61G 1/00
USPC ...................................................... 5/627, 625
See application file for complete search history.

(56) References Cited

U.S. PATENT DOCUMENTS 261,796 A * 7/1882 Wells ..................... A61G 1/013 5/120
542,374 A * 7/1895 Sauerbier et al. ... A47C 19/122 5/111
1,080,577 A * 12/1913 Pascale et al. ......... A47C 17/68 5/187
1,164,828 A * 12/1915 Luria ..................... A61G 1/013 5/112
1,205,186 A * 11/1916 Fuchs .................... A61G 1/013 5/310
1,305,388 A * 6/1919 Luria ....................... A61G 1/00 5/310
1,857,008 A * 5/1932 Adcock .................. A61G 1/003 5/191
2,614,266 A * 10/1952 Smith .................... A61G 1/003 5/236.1
2,745,114 A * 5/1956 Cote ...................... A61G 1/013 5/116
2,880,427 A * 4/1959 Atwood ................. A61G 1/048 5/627
3,336,060 A * 8/1967 Bradford ................ A61G 1/003 5/8

(Continued)

FOREIGN PATENT DOCUMENTS

CN 111529219 A 8/2020
CN 213525962 U 6/2021

(Continued)

*Primary Examiner* — Robert G Santos
(74) *Attorney, Agent, or Firm* — The Webb Law Firm

(57) ABSTRACT

Disclosed herein is a stretcher for transporting individual(s), the stretcher including two main rods, wherein each main rod is movable along a longitudinal direction between a contracted position and an extended position; and a lying structure being releasably connected to each of the two main rods.

22 Claims, 3 Drawing Sheets

(56) References Cited

U.S. PATENT DOCUMENTS

| | | | | | |
|---|---|---|---|---|---|
| 3,426,367 | A * | 2/1969 | Bradford | A61G 1/013 5/628 |
| 3,597,773 | A * | 8/1971 | Firestone | A61G 1/003 248/354.3 |
| 5,384,926 | A * | 1/1995 | Al-Bargi | A61G 1/013 5/628 |
| 9,770,375 | B2 * | 9/2017 | Lin | A61G 7/1025 |
| 11,351,072 | B2 * | 6/2022 | Suvire Ante | A61G 1/013 |
| 2017/0007475 | A1 | 1/2017 | Lin et al. | |
| 2021/0069036 | A1 | 3/2021 | Suvire Ante | |
| 2025/0000723 | A1 * | 1/2025 | Plass | A61G 1/013 |

FOREIGN PATENT DOCUMENTS

| | | | | |
|---|---|---|---|---|
| EP | 4436532 | B1 * | 9/2025 | |
| WO | 2015127700 | A1 | 9/2015 | |
| WO | WO-2023089013 | A1 * | 5/2023 | A61G 1/013 |

* cited by examiner

MODULAR RESCUE STRETCHER

CROSS-REFERENCE TO RELATED APPLICATIONS

This application is the United States national phase of International Patent Application No. PCT/EP2022/082243 filed Nov. 17, 2022, and claims priority to Swiss Patent Application No. CH070586/2021 filed Nov. 22, 2021, the disclosures of each of which are hereby incorporated by reference in their entireties.

BACKGROUND

Field of the Invention

The present invention lies in the field of rescue stretchers and relates to a stretcher, the use of such a stretcher and a method of its assembly.

Description of Related Art

In general, there are two types of rescue stretchers known in the prior art. A first type relates to massive and heavy rescue stretchers comprising typically hard polymer shells and additionally various different medical instruments such as computers, monitors, IV systems including pumps, etc. Such rescue stretchers are usually used in civil environments, i.e. by hospitals or ambulances. A second type of rescue stretchers relates to military rescue stretchers, such as NATO stretchers. These are significantly lighter and often have a much simpler structure, i.e. they often merely consist of two cylindrical bars and a flexible textile lying surface in between the bars. Such military rescue stretchers are typically used on the battle field or other rough terrain, such as in the wilderness, i.e. the jungle. Thus, these stretchers must often be carried and transported over many days and large distances, which makes it crucial that they are compact to carry it as easy as possible with other equipment and in this context also of general lightweight, and in function it should be as convenient and practical as possible for patients as well as carriers. The invention at hand relates to such second type of stretchers, e.g. military stretchers. A common problem with such stretchers is however that they are relatively bulky, as they must be suitable to transport human beings and must therefore have a length of around 2 m. This makes the transport of the stretcher when it is not in use, cumbersome. Overall in particular for military applications, it is crucial that the stretcher can be rapidly and easy to be assembled, as they may for example be used to transport an injured soldier away from the battle field under enemy fire in a stressed and hectic situation. A further problem with state of the art rescue stretchers is that they have typically a standardized and fixed length of about 2 m. Such a significant length can be problematic in particular when maneuvering through narrow terrain, such as houses or dense forests.

SUMMARY OF DISCLOSURE

It is the general object of the present invention to advance the state of the art of rescue stretchers and preferably to overcome the problems of the prior art mentioned above fully or partly. In favorable embodiments, a stretcher is provided which can be carried in a simpler manner than stretchers known in the prior art and which requires less space when not in use. In additional favorable embodiments, a stretcher is provided which can be assembled in a short period of time. In further favorable embodiments, a stretcher is provided which provides for a stable and endurable lying surface.

The general object is achieved by the subject-matter disclosed herein.

In a first aspect, the general object is achieved by a stretcher for transporting individual(s), the stretcher comprising two main rods and a lying structure. Each of the two main rods is movable along its longitudinal direction between a contracted position and an extended position. The lying structure is releasably connected to each of the two main rods. The stretcher is therefore a modular stretcher, which is further adjustable in its length due to the movable main rods. Thereby, transport efficiency is increased. The modular principle allows to enables a space-saving and low weighted entrainment of a stretcher in a mini bag during missions In some embodiments, the lying structure comprises a plurality of lying elements each extending between the two main rods. Furthermore, the lying elements may in the longitudinal direction be spaced apart from each other. This means, the lying elements are not in direct contact with each other but define a gap between them. In some embodiments, the gaps between the lying structures extend continuously between the two main rods.

In certain embodiments, the lying structure comprises between 3 and 10 lying elements, in particular between 4 and 8 lying elements, in particular 4 to 6 lying elements. It is understood that if the lying structure comprises multiple lying elements, each lying element is preferably itself releasably connected to each of the two main rods. As mentioned further below, these lying elements may for example be bands or crawler chain structures. In preferred embodiments, the lying structure comprises 5 lying elements extending between the main rods. This is advantageous, because for anatomic reasons, there are 5 contact positions of the human body with a laying surface, namely head, shoulder, lower back, lower leg and heel. In certain embodiments, the main rods comprises multiple force locking connection and/or a form locking connection structures, such as recesses, configured for adjusting the relative position of the lying elements to each other depending on the anatomical dimensions of the individual to be transported.

In some embodiments, the lying structure comprises one or more crawler chain structures, which each comprises a plurality of struts extending essentially in parallel to each other.

In embodiments with only a single crawler chain structure, the plurality of struts may in some embodiments be considered as the plurality of lying elements. That is, each strut may then be a lying element. In such embodiments, the stretcher for transporting individual(s) comprises: a) two main rods, wherein each main rod is movable along a longitudinal direction between a contracted position and an extended position; and b) a lying structure being releasably connected to each of the two main rods, wherein the lying structure comprises a crawler chain structure having a plurality of struts extending essentially in parallel to each other.

In some embodiments, the struts each extend transversely to the longitudinal direction, that is, transversely to the main rods.

In embodiments with more than one crawler chain structures, each crawler chain structure may as a whole be considered as a lying element, i.e. each crawler chain structure may be a lying element. In such embodiments, the stretcher for transporting individual(s) comprises: a) two main rods, wherein each main rod is movable along a longitudinal direction between a contracted position and an extended position; and b) a lying structure being releasably connected to each of the two main rods, wherein the lying structure comprises, or consists of, multiple crawler chain structures having a plurality of struts extending essentially in parallel to each other. Thus, each crawler chain structure of the crawler chain structures may extend between the two main rods. Additionally, the crawler chain structures may extend in parallel to each other.

In some embodiments, the struts each extend in the longitudinal direction, in particular in parallel to the main rods. In such embodiments, the lying structure may comprise of multiple crawler chain structures. Typically the struts of such crawler chain structures may be shorter and thus their transport in the unassembled state is facilitated. The multiple crawler chain structures may in some embodiments be spaced apart from each other. That is, they define a gap between each other.

In some embodiments, the lying surface comprises multiple crawler chain structures, i.e. crawler chain structures as described herein. In particular embodiments, the crawler chain structures are separate and/or spaced apart from each other. In some embodiments, the lying surface comprises of two, three, four or five crawler chain structures.

In some embodiments in which the lying surface comprises multiple crawler chain structures, the struts of each crawler chain structure preferably extend in the longitudinal direction, in particular in parallel to the main rods.

In certain embodiments, each crawler chain structure may be configured such that the lying structure does not collapse under a weight of 150 kg or less, in particular of 100 kg or less. In particular, the struts of each crawler chain structure can in some embodiments be engaged with each other such that the lying structure does not collapse under a weight of 150 kg or less, in particular of 100 kg or less. For example, the struts of each crawler chain structure may releasably be engaged with each other via a force locking and/or form locking structure.

Embodiments in which the lying structure comprises multiple crawler chain structures have the advantage that the required surface of a lying structure can be distributed over the multiple crawler chain structures. Since the crawler chain structures are relatively small as compared to a continuous lying surface, the require less space during transport. Furthermore as each crawler chain structure can be carried by a different team member, the stretcher is even less space demanding and can thus be more easily transported.

The two main rods may for example each have in their extended positions a tubular structure, i.e. they may be hollow tubes. In particular, the two main rods may have a round, e.g. circular or ovoid, or an angular, e.g. rectangular, cross section. Typically, the two main rods are arranged in parallel to each other.

Directions as used herein are to be understood as follows: The longitudinal direction refers to the direction along which the two main rods extend. That is, in the operational state in which an individual is lying on the lying structure, from head to feet of the individual. In the assembled state, i.e. when the lying structure is connected to the main rods, the longitudinal directions of the main rods and of the stretcher are identical. The transverse direction is perpendicular to the longitudinal direction. The lying surface, i.e. the surface on which the individual can be placed for transport, lies in a plane defined by the longitudinal direction and the transverse direction. The vertical direction is perpendicular to the longitudinal direction and the transverse direction. In the operative state, i.e. when two persons are carrying an individual on the stretcher, the longitudinal direction and the transverse direction are essentially parallel to an even ground surface and the vertical direction is perpendicular to the ground surface, respectively is oppositely arranged to the gravitational force vector.

A movable rod between the contracted and the extended position is a rod whose length can be adjusted, i.e. the rod is shorter in the contracted position than in the extended position. Typically, the main rods can each be extended from the contracted position to the extended position and each be retracted from the extended position to the contracted position. Thus, such rods may be considered as extendable rods.

In some embodiments, the length of each main rod, i.e. its extension in the longitudinal direction, can be adjusted and/or selected between the contracted position and a maximally extended position. The maximally extended position may for example result in a length of each main rod of 2 m to 2.5 m.

Providing such adjustable main rods has the advantage that the overall length of the stretcher can be adjusted to the height of the individual being transported. Therefore, the length of the stretcher can be minimized, which improves movability through narrow terrain. In some embodiments, the length of each main rod can be adjusted in a continuous or in a stepwise manner. This may for example be possible by selectively removing parts of the main rods, for example cylindrical elements as outlined further below, or by releasable providing a plurality of form locking and/or force locking structures at regular length intervals. For example it may be possible to provide such form locking and/or force locking structures such that each main rod can be locked at a length of 150 cm, 160 cm, 170 cm, 180 cm, 190 cm and 200 cm. It is understood that such structures may for example consists of a female part and a male part which form a form-locking engagement. Alternatively it is also possible that a form locking and/or force locking engagement can be achieved by a frictional lock between movable elements, such as the cylindrical elements of a corresponding telescopic mechanism as described herein.

A crawler chain structure typically comprises a plurality of chain elements which are connected to each other, but which are movable with respect to each other in at least one direction. A crawler chain structure has not necessarily an endless belt structure, but also composes single layer structures, i.e. structures which have two end sections which are not connected, that is not directly connected, to each other. Employing a crawler chain structure being releasably connected to each of the two main rods has the advantage, that the lying structure can be coiled together, as crawler chain structures can be coiled and thus be easily transported, as the coiled crawler chain structure is not as bulky as in the extended, i.e. connected state. Concomitantly, a crawler chain structure provides a stable and preferably solid, lying surface which provides much more stability than a mere textile cloth as it used in common NATO type rescue stretchers.

The term “releasably connected” as used herein means that the connection can be released without destroying the connected components, respectively parts thereof. For example, a material bonding, such as gluing or welding is not a releasable connection, because it cannot be released without destroying, respectively altering, the two connected components and particularly without altering their structural integrity. Additionally, a releasable connection can undergo multiple connection/disconnection cycles, in particular in the same manner. Typically, a releasable connection can be released without applying considerable forces.

In certain embodiments, each main rod comprises recesses and at least some or all of the lying elements, in particular each band or each crawler chain structure, comprises a snap lug forming, and/or being configured to form, a releasable form-locking connection with a recess of the main rod.

In some embodiments, the stretcher may particularly be a modular stretcher, i.e. it may have a modular setup. That is, the stretcher may consist of different components which are releasably connected with each other.

In some embodiments, all releasable connections may be plug in connections, threaded connections and/or snap connections, particularly plug in connections and/or snap connections.

In some embodiments, the stretcher comprises or essentially consists of the two main rods, respectively the half rods as described herein, the lying structure, in particular the crawler chain structure(s) or bands, and optionally the textile or foam and optionally the transversal rods as described herein.

In some embodiments, the length of each main rod, respectively of each half rod, in the contracted position is up to 50%, particularly up to 75%, particularly up to 85%, particularly up to 90%, of the length of the corresponding main rod, respectively half rod, in the extended position.

In some embodiments, each strut may have a width of 5 cm to 50 cm, in particular of 10 cm to 40 cm. The width typically refers to the extension of each strut along a hypothetical axis which crosses all struts of the corresponding crawler chain structure. Typically, the width of each strut is shorter than the length of each strut. In embodiments, in which the lying surface comprises multiple crawler chain structures whose struts each extend in the longitudinal direction, the struts may have a length, i.e. in this embodiment an extension in the longitudinal direction, of 5 cm-30 cm, in particular of 5 cm-20 cm, in particular of 5 cm-15 cm.

In some embodiments, each crawler chain structure may comprise a belt, e.g. a textile, metal or leather belt, to which the struts of the crawler chain structure are connected. Particularly, the belt may be flexible, i.e. it may have no inherent stability along at least one direction against the gravitational force. Preferably, each crawler chain structure comprises a belt which connects the struts, in particular all struts, at their base portions with each other. As the belt connects the struts at their base portions, it is along the vertical direction arranged below the struts. Thus, such a belt may be considered as a bottom belt. Alternatively, the struts may comprise a ladder buckle structure as disclosed further below and a belt may be threaded through such ladder buckle structures to connect the struts together.

In some embodiments, each crawler chain structure may comprise a top belt and a bottom belt, between which the plurality of struts is arranged and to which the struts are typically connected.

The struts typically extend in the transverse direction. Preferably, the struts may be arranged in parallel to each other. The struts may further be spaced apart from each other thereby defining a gap between two neighboring struts.

The struts may in particular each be perpendicular to the each of the main rods.

In some embodiments, the struts comprise in the cross section along the longitudinal direction and perpendicular to the transverse direction a chevron shape.

In some embodiments, the lying elements are bands. The bands may for example be textile bands or preferably Kevlar (i.e. poly-paraphenylene terephtalamide) bands.

In some embodiments, each main rod comprises a telescopic mechanism, which is configured for moving the main rod between the contracted position and the extended position. The telescopic mechanism may for example comprise several coaxially arranged rod sections, which are configured to be inserted into each other. In certain embodiments, the rod sections may be made from a single piece, i.e. they may for example be of a spiral structure in the contracted position. In other embodiments, the rod sections may each be made of separate pieces, for example of separate cylindrical elements.

In certain embodiments, each main rod has in the contracted position a spiral structure and in the extended position a helix structure, in particular a conical helix structure. As the skilled person understands, a spiral structure is a single piece being coaxially wound around itself. Such a structure has the advantage that it can be easily manufactured and can particularly be of low weight, as in contrast to other telescopic mechanisms, there are no individual parts which must be functionally connected by additional components.

In some embodiments, wherein each main rod comprises of a plurality of concentrically arranged cylindrical elements which are in the contracted position slid into each other.

In some embodiments, each of the two main rods consists of two half rods, wherein the two half rods are releasably connected with each other at their distal ends to form the main rod. The distal end is along the longitudinal direction, the most distal end section. Such embodiments have the advantage that each main rod can be disassembled into two half rods. Thereby, the total weight of the stretcher can be distributed over more team members, which simplifies and improves the transportability of the stretcher. Typically the length of each half rod of a half rod pair forming a main rod is the same, in particular both in the contracted position and in the extended position.

It is understood, that in such embodiments, each of the half rods is itself movable along its longitudinal direction between a contracted position and an extended position. Thus, each half rod may comprise a telescopic mechanism, which is configured for moving the half rod between the contracted position and the extended position. The telescopic mechanism may for example comprise several coaxially arranged rod sections, which are configured to be inserted into each other. In certain embodiments, the rod sections may be made from a single piece, i.e. they may for example be of a spiral structure in the contracted position. In other embodiments, the rod sections may each be made of separate pieces, for example of separate cylindrical elements. In certain embodiments, each half rod has in the contracted position a spiral structure and in the extended position a helix structure, in particular a conical helix structure. Two half rods are then releasably connected to each other in their corresponding extended position. In certain embodiments the rod sections are made of separate cylindrical elements and each half rod consists of 2 to 8 cylindrical elements, in particular 3 to 6 cylindrical elements.

In certain embodiments, the two half rods, i.e. the two half rods of each of the two half rod pairs, are releasably connected with each other by a bayonet joint, a snap on connection or a threaded connection.

In some embodiments, the stretcher further comprises two or more transversal rods. Each transversal rod may be releasably connected to the two main rods. Preferably each transversal rod extends between the two main rods. In certain embodiments, each transversal rod is movable by a telescopic mechanism between a contracted position and an extended position. Transversal rods increase the stability of the stretcher in the operative state. In some embodiments, each transversal rod comprises a locking structure which is configured to lock the transversal rod in the extended position. In some embodiments, the transversal rods are connected to the main rods at opposite ends of the main rods. In certain embodiments, the transversal rods are arranged such that they form together with the main rods a frame which surrounds the lying structure.

In some embodiments, each of the two main rods, respectively each of the four half rods, and/or each of the transversal rods, can be pretensioned, respectively is pretensioned, in the contracted position such that it can be released and moved into the extended position by activating an activation button on the main rod or the transversal rod. The pretension may for example be an inherent pretension of the rod material. For example, if the corresponding rod has a spiral structure in the contracted position, there may be an inherent material bias to relax into the helix structure of the extended position. Alternatively, each main rod, respectively each half rod, and/or each transversal rod, may comprise a biasing element, such as a spring or a resilient polymer material, which provides for the pretension.

The activation button may be coupled to a release mechanism, which has a blocking configuration in which the main rod, respectively the half rod, is maintained in the contracted position and in which it is prevented from moving into the extended position. The release mechanism may also have a release configuration in which the main rod, respectively the half rod, and/or the transversal rod, is released into the extended position. Such embodiments have the advantage that the assembly time of the stretcher is significantly decreased.

In some embodiments, the lying structure, and in particular the crawler chain structure, is releasably connected to each of the two main rods by a force locking connection and/or a form locking connection, such as a snap on connection or a loop connection. For example, the lying structure may on its lateral sides comprise a loop, such as a textile loop, through which the main rods, respectively the half rods can be guided. Alternatively, the lying structure may comprise locking lugs which may engage with corresponding receptacles of the main rods, respectively the half rods.

In some embodiments, each strut of the lying structure defines at least two openings, wherein each opening is configured such that a ladder buckle structure is formed and wherein a belt is guided through each ladder buckle structure. As the skilled person understands, a ladder buckle structure is defined by a truss extending in a specific direction, e.g. the transverse direction, and two adjacent openings. A belt is guided from the bottom through one of the openings over the truss and then from the top through the second adjacent opening back to the bottom. In this manner, a crawler chain structure is formed.

In some embodiments, the lying structure further comprises a textile or foam being arranged between and/or on top of the plurality of struts or the plurality of bands. In some embodiments, the textile or foam forms a closed lying surface. Such a textile or foam allows for increasing the comfort of the individual being transported.

In some embodiments, the lying structure and in particular the crawler chain structure, is in an unconnected state, in which it is not connected to the two main rods, configured such that it can be coiled into a coil. This has the advantage, that the lying structure can be coiled together, as crawler chain structures can be coiled and thus be easily transported, because the coiled crawler chain structure is not as bulky as in the extended, i.e. connected state.

In some embodiments, the lying structure and in particular the crawler chain structure, is in an unconnected state, in which it is not connected to the two main rods, inflexible along the transverse direction along which the struts extend and flexible along the thereto perpendicular longitudinal direction.

In some embodiments, the lying structure and in particular the crawler chain structure, is in the unconnected state along the longitudinal direction flexible in a negative vertical direction and essentially inflexible in a thereto opposite, positive vertical direction.

In some embodiments, each strut comprises a joint at its base portion by which neighboring struts are connected with each other such that the struts are pivotable to each other when the lying structure and in particular the crawler chain structure, is in an unconnected state, in which it is not connected to the two main rods, respectively the half rods. The joint may in some embodiments be an element which allows for the pivoting movement of the two neighboring struts. For example, the joint may be a cylindrical joint, a spherical joint or the like. However, it is also possible that the joint is formed from a belt as described above, in particular a flexible belt, which connects the struts at their base portions.

In some embodiments, the two main rods, respectively the half rods, and/or the crawler chain structure are made from metal, polymer, carbon fiber material and/or mixtures thereof, in particular carbon fiber reinforced polymer. Such embodiments are advantageous, because they allow to reduce the weight of the individual components while ensuring a high stability. In embodiments of the stretcher with transversal rods as described herein, the transversal rods may be made from metal, polymer, carbon fiber material and/or mixtures thereof, in particular carbon fiber reinforced polymer.

In some embodiments, the main rods, respectively the half rods, comprise handles at their ends. The handles can have a reduced or increased diameter compared to the main rods, respectively half rods, in order to facilitate the grip for the bearers of the stretcher.

In some embodiments, the main rods, respectively the half rods, comprise lighting devices. For example, the lightning devices may be arranged at an end of the lying surface for illuminating the head of the transported individual. Additionally, or alternatively, lightning devices may be arranged on the main rods, respectively the half rods, configured for illuminating the ground.

In some embodiments, the two main rods, respectively the half rods, and/or the lying structure may comprise fastening bands being configured for securing the arms and/or legs of an individual being carried on the stretcher.

In some embodiments, the main rods, the lying structure and optionally the half rods, and optionally the transversal rods, and optionally the bands or crawler chain structures, comprise a tag indicating to which other element (e.g. main rod, lying structure, half rod, transversal rod, band or crawler chain structure) they have to be connected. For example, two elements may comprise a corresponding tag, such as a corresponding symbol or a corresponding number or letter, for indicating that these parts have to be connected to each other.

In a further aspect, the overall objective is achieved by the use of a stretcher according to any of the embodiments as described herein for transporting individual(s).

In a further aspect, the overall objective is achieved by a method for assembling a stretcher according to any of the previous claims, wherein the lying structure is connected to the two main rods and wherein optionally the two main rods are each first assembled by connecting two half rods.

In a further aspect, the overall objective is achieved by a kit of parts configured for being assembled to a stretcher according to any of the embodiments as described herein. The kit comprises two main rods wherein each main rod is movable along a longitudinal direction between a contracted position and an extended position and a lying structure being releasably connectable to each of the two main rods.

In some embodiments, the lying structure comprises a plurality of lying elements each extending between the two main rods. Furthermore, the lying elements may in the longitudinal direction be spaced apart from each other. This means, the lying elements are not in direct contact with each other but define a gap between them. In certain embodiments, the lying structure comprises between 3 and 10 lying elements, in particular between 4 and 8 lying elements, in particular 4 to 6 lying elements. As mentioned above, these lying elements may be bands or crawler chain structures. In preferred embodiments, the lying structure comprises 5 lying elements extending between the main rods. This is advantageous, because for anatomic reasons, there are 5 contact positions of the human body with a laying surface, namely head, shoulder, lower back, lower leg and heel. In certain embodiments, the main rods comprises multiple force locking connection and/or a form locking connection structures, such as recesses, configured for adjusting the relative position of the lying elements to each other depending on the anatomical dimensions of the individual to be transported.

In some embodiments, the lying structure comprises one or more crawler chain structures, which each comprises a plurality of struts extending essentially in parallel to each other.

In embodiments with only a single crawler chain structure, the plurality of struts may in some embodiments be considered as the plurality of lying elements. That is, each strut is may then be a lying element.

In embodiments with more than one crawler chain structures, each crawler chain structure may be considered as a lying element, i.e. each crawler chain structure may be a lying element.

In some embodiments, the kit further comprises two or more transversal rods. Each transversal rod may be releasably connectable to the two main rods.

It is understood that the lying structure, the crawler chain structure, the struts, the bands the two main rods and/or the transversal rods may in some embodiments be of the type as described with respect to any other embodiments of the stretcher as described herein.

In some embodiments, the kit further comprises a bag for storing the lying structure, the crawler chain structure, the struts, the bands, the two main rods and/or the transversal rods. Preferably, the lying structure, the crawler chain structure, the struts, the bands, the two main rods and/or the transversal rods are stored in the bag. The bag may further comprises a releasable fastening structure, such as a hook and loop fastener (e.g. a Velcro fastener). In addition, the two main rods and/or the lying structure may also comprise a corresponding fastening structure being configured for establishing a releasable connection with the fastening structure of the bag. Advantageously, the bag may thus serve as a head support, e.g. a pillow, for the individual resting on the lying structure.

In some embodiments, the kit further comprise fastening bands, in particular fastening bands having a releasable fastening structure, such as a hook and loop structure, which are configured for securing the arms and/or legs of an individual being carried on the stretcher.

In some embodiments, the kit further comprises four collars configured for being slipped over the two ends of each main rod. Such collars may serve to increase the diameter of the ends of the main rods and improve the grip for the carriers of the stretcher.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION

Figure 1:
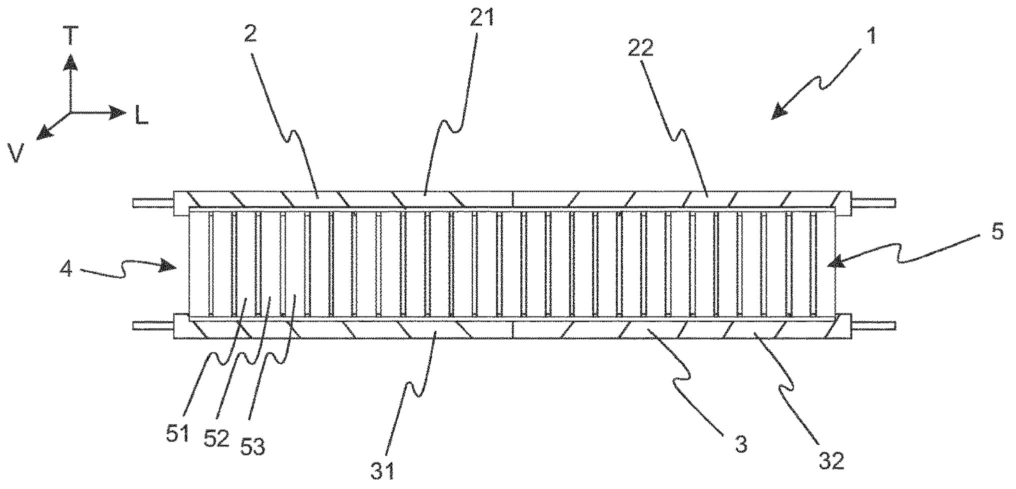
FIG. 1 a schematic view on a stretcher according to an embodiment of the invention.

FIG. 1 shows a stretcher 1 for transporting individual(s), which comprises two main rods 2 and 3 which extend in parallel to each other along the longitudinal direction L. The longitudinal direction L is perpendicular to the transverse direction T and the vertical direction V. Each of the main rods is movable between a contracted position (not shown, see FIG. 2*b*) and an extended position, in which the two main rods currently are in FIG. 1. Stretcher 1 further includes lying structure 4 which comprises crawler chain structure 5. Crawler structure 5 contains a plurality of struts 51, 52, 53 (only three struts are referenced for clarity purposes) which extend transversely to longitudinal direction L of stretcher 1, i.e. transversely to the two main rods 2 and 3. Each main rod comprises a telescopic mechanism. In the embodiment shown, each main rod has in the shown extended position a helix structure. Each main rod 2 and 3 consists of two half rods 21 and 22, respectively 31 and 32, which are at their respective distal ends releasably connected to each other to form the corresponding main rod 2, respectively 3. Struts 51, 52, 53 form a lying surface for transporting an individual.

Figure 2A:
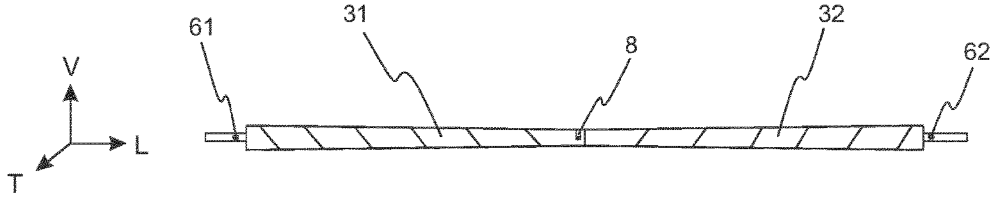
FIG. 2*a* a schematic side view of two half rods in their extended position forming a main rod as they are employed some embodiments of the invention.
Figure 2B:
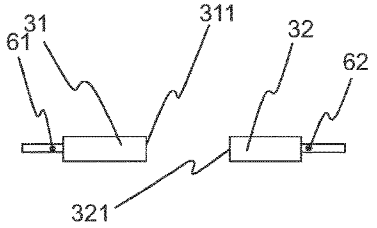
FIG. 2*b* a schematic side view of the two half rods of FIG. 2*a* in their contracted position.

FIG. 2*a* shows a side view, i.e. along the transversal direction T onto two connected half rods 31 and 32. Both half rods are in their respective extended position and are releasably connected to each other by bayonet joint 8. As can be seen, each half rod as in the extended position a conical helix structure. Both half rods contain an activation button 61 and 62, by which the half rods can be brought from their contracted positions into their extended positions. FIG. 2*b* shows the two half rods 31 and 32 of FIG. 2*a* in their corresponding contracted positions and in an unconnected state. Half rods 31 and 32 face each other with their distal ends 311 and 321. Both half rods have in their contracted position a spiral structure (see FIG. 3). In the depicted contracted position, the half rods are pretensioned, i.e. they are biased towards their respective extended position. Upon activating the activation button 61, 62, this pretension is released and the respective half rod moves from the contracted position into the extended position. In general, it may be possible that if the main rods, respectively the half rods, have in the contracted position a spiral structure and in the extended position a helix structure, then the pretension may be achieved by a spiral spring structure, i.e. the rods are inherently pretensioned in their contracted positions.

Figure 3:
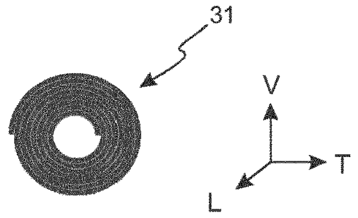
FIG. 3 a front view of a half rod as it is employed in some embodiments of the invention.

FIG. 3 shows a half rod 31 in its contracted position having a spiral structure and being viewed from its distal end along the longitudinal direction.

Figure 4:
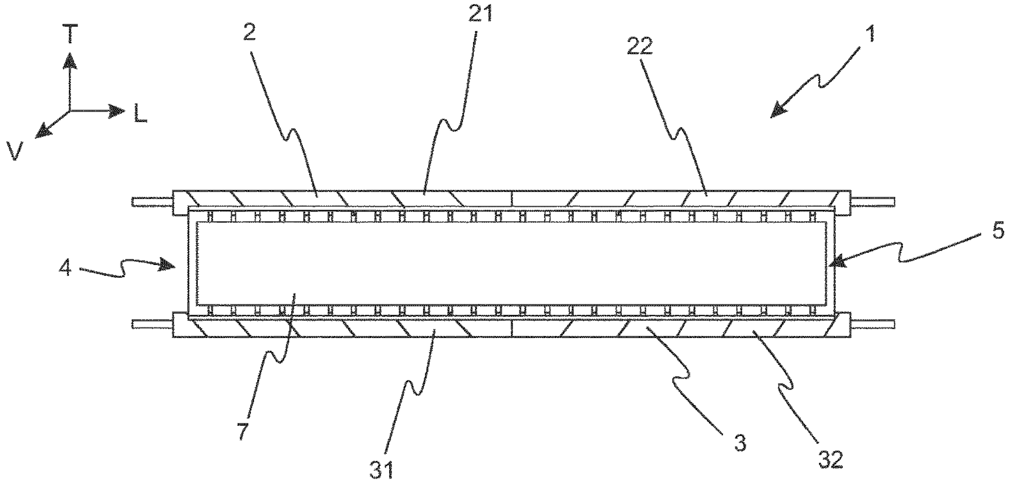
FIG. 4 a schematic view on a stretcher according to another embodiment of the invention.

FIG. 4 shows another embodiment of the stretcher 1, in which lying structure 4 further comprises textile 7, which provides a continuous lying surface for an individual and which is arranged on top of the struts of the crawler chain structure.

Figure 5:
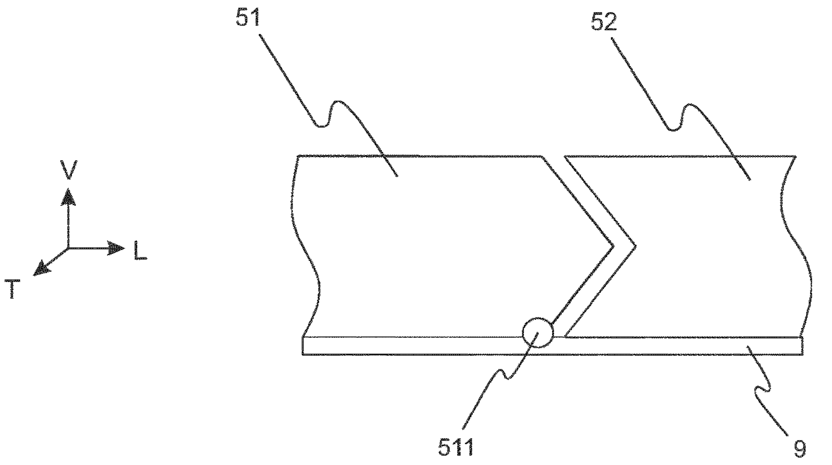
FIG. 5 a schematic cross sectional view of two struts of the crawler chain structure of a stretcher according to another embodiment of the invention.

FIG. 5 shows a cross-sectional view along the longitudinal direction through two struts 51 and 52 of a crawler chain structure as it is used in some embodiments of the invention. As can be seen, the struts comprise in the cross section along the longitudinal direction and perpendicular to the transverse direction a chevron shape. Furthermore, the struts are connected at their bases by joint 511, which allows a pivoting movement of the two struts with respect to each other, and also by belt 9. However, as the struts are chevron shaped and because the struts are connected by joint 511 at their bases, pivoting is essentially only possible in one direction. Thus, the crawler chain structure can only be coiled in one direction and not in the opposite direction.

Figure 6A:
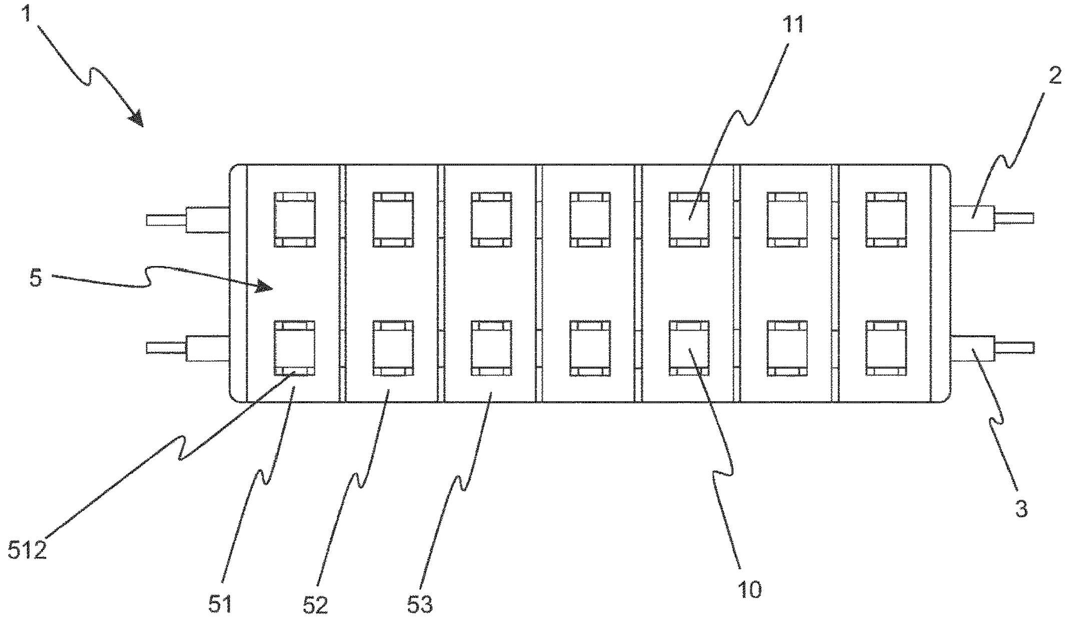
FIG. 6*a* a schematic view on a stretcher according to another embodiment of the invention.

FIG. 6*a* shows a top view on stretcher 1 according to another embodiment. Crawler chain structure 5 comprises seven struts 51, 52, 53 (only three struts are referenced due to clarity reasons). Each strut comprises four openings, wherein always two openings are configured such that they form a ladder buckle structure, i.e. one opening is arranged adjacent a transverse truss 512. In the embodiment shown, belt 10 and belt 11 are threaded through the ladder buckle structures to connect the struts together. Thus, each belt is guided from the bottom side (not shown) through one of the openings of each strut to the front side on which the viewer views in FIG. 6, over the truss and then back to the bottom side to the next strut.

Figure 6B:
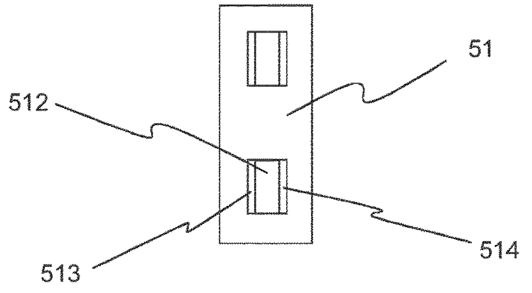
FIG. 6*b* a schematic view of a strut of the embodiment shown in FIG. 6*a;*

FIG. 6*b* shows strut 51 without belt 10. As can be seen, adjacent truss 512 are openings 513 and 514, thereby forming a ladder buckle structure.

Figure 7:
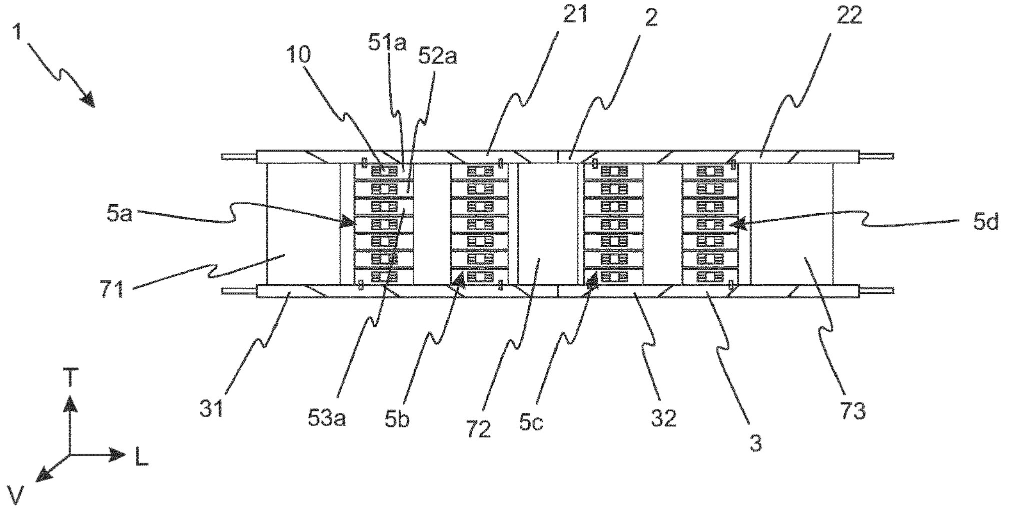
FIG. 7 a schematic view on a stretcher according to another embodiment of the invention.

FIG. 7 shows a stretcher 1 according to another embodiment of the invention. In contrast to the stretcher of FIG. 6*a*, the lying structure of this stretcher comprises four separate crawler chain structures 5*a*, 5*b*, 5*c* and 5*d*. Such multiple crawler chain structures may be spaced apart from each other, i.e. there may be a gap between the crawler chain structures. Furthermore, in contrast to the stretcher of FIG. 6*a*, the struts 51*a*, 52*a*, 53*a* (for clarity purposes, only these three struts of crawler chain structure 5*a* are referenced) of each crawler chain structure extend in the longitudinal direction L, i.e. they are parallel to the two main rods 2 and 3. As in the embodiment of FIG. 1, the two main rods each consist of two half rods 21 and 22, respectively 31 and 32. Each strut comprises two openings which are configured such that they form a ladder buckle structure, i.e. one opening is arranged adjacent a transverse truss. In the embodiment shown, belt 10 is threaded through the ladder buckle structure of crawler chain structure 5*a* to connect the struts together. The crawler chain structures 5*a*, 5*b*, 5*c* and 5*d* are configured such that the lying structure and the crawler chain structures do not collapse under a weight of 150 kg or less, in particular of 100 kg or less. Thus, if an individual to be transported is placed on the crawler chain structures 5*a*, 5*b*, 5*c* and 5*d*, a force acts against the vertical direction V, and the lying surface, respectively crawler chain structure does not collapse under such a weight, which is typically less than 150 kg. For example, belt 10 may prevent collapsing of the lying surface.

Alternatively, or additionally, the struts may be struts as shown in FIG. 5, i.e. the struts may comprise in the cross section along the longitudinal direction and perpendicular to the transverse direction a chevron shape. Furthermore, the struts may be connected at their bases by joint (see 511 of FIG. 5), which allows a pivoting movement of the two struts with respect to each other. However, as the struts are chevron shaped and because the struts are connected by such a joint, pivoting is essentially only possible in the direction towards the viewer, i.e. in the vertical direction, but not against the vertical direction V. Stretcher 1 of FIG. 7 further comprises three textiles 71, 72, 73, such as textile cloths. Textile cloth 71 may support the head of the individual to be transported, textile cloth 72 being arranged between crawler chain structure 5*a* and crawler chain structure 5*b* may support the lower back of the individual and textile 73 may support the feet of the individual to be transported.

Figure 8:
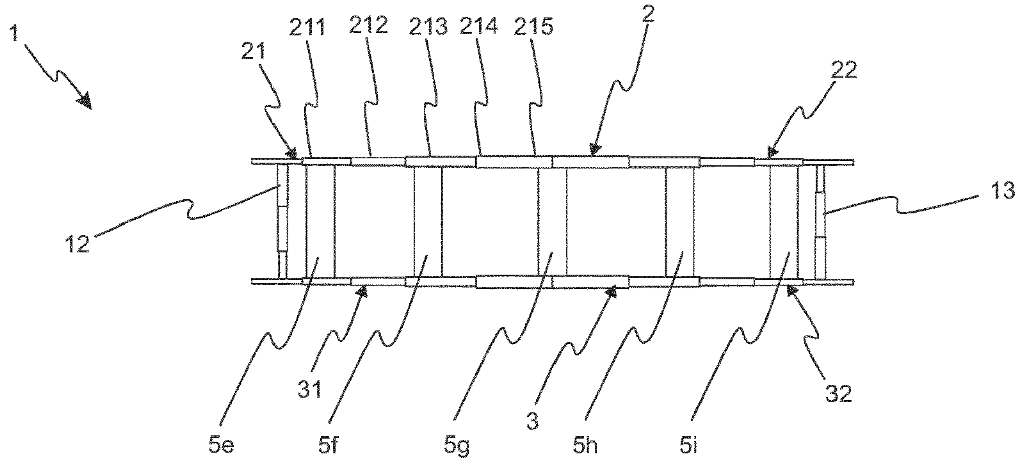
FIG. 8 a schematic view on a stretcher according to another embodiment of the invention.

FIG. 8 shows a stretcher 1 according to another embodiment of the invention. The stretcher 1 has two main rods 2 and 3, which each consists of two half rods 21 and 22, respectively 31 and 32. Each half rod may in this or any other embodiment as described herein, consist of a plurality of cylindrical elements 211, 212, 213, 214 and 215 (only the five cylindrical elements of half rod 21 are referenced for clarity purposes). These cylindrical elements can in the contracted position be slid into each other and therefore form a telescopic mechanism for moving the corresponding half rod and/or main rod along its longitudinal direction between a contracted position and an extended position. Furthermore, the lying structure in this embodiments comprises five lying elements, which in this embodiment are five bands 5*e*, 5*f*, 5*g*, 5*h* and 5*i*. In addition to the two main rods 2 and 3, stretcher 1 further comprises two transversal rods 12 and 13 which are releasably connected to the two main rods 2 and 3 and extend between the two main rods. As it is the case for the main rods 2 and 3 in FIG. 8, also transversal rods 12 and 13 consist each of a plurality of cylindrical elements which can in a contracted position be slid into each other. The transversal rods 12 and 13 are therefore also movable between a contracted position and an extended position. Additionally, transversal rods 12 and 13 are arranged at opposite ends of main rods 2 and 3 and form together with the main rods a frame which surrounds the lying surface.

Figure 9:
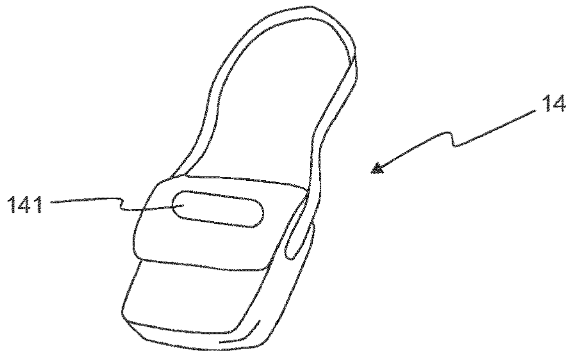
FIG. 9 a bag as it may be used in a kit of parts according to some embodiments of the invention.

FIG. 9 discloses a bag 14 as it can be used in a kit of parts according to an embodiment of the invention. All elements of the stretcher, such as the main rods (or the corresponding half rods) and the lying structure, and optionally further the crawler chain structures, the bands, the textile or foam and/or the transversal rods, etc. can be stored in one or more of these bags. The bag may further comprise fastening structure 141 which may for example be a hook and loop fastener being configured for attaching bag 14 to the lying structure and/or the main rods of a stretcher according to the invention.

The invention claimed is:

1. A stretcher for transporting individual(s), the stretcher comprising:
   a. two main rods, wherein each main rod is movable along a longitudinal direction between a contracted position and an extended position, and wherein each main rod has in the contracted position a spiral structure and in the extended position a helix structure; and
   b. a lying structure being releasably connected to each of the two main rods.

2. The stretcher according to claim 1, wherein the lying structure comprises a plurality of lying elements each extending between the two main rods and being in the longitudinal direction spaced apart from each other.

3. The stretcher according to claim 2, wherein the lying elements are bands.

4. The stretcher according to claim 1, wherein the lying structure comprises one or more crawler chain structures, each crawler chain structure having a plurality of struts extending essentially in parallel to each other.

5. The stretcher according to claim 4, wherein the plurality of struts extend transversely to the longitudinal direction or wherein the plurality of struts extend in the longitudinal direction.

6. The stretcher according to claim 4, wherein each strut of the lying structure defines at least two openings, wherein each opening is configured such that a ladder buckle structure is formed, and wherein a belt is guided through each ladder buckle structure to form the crawler chain structure.

7. The stretcher according to claim 4, wherein each strut comprises a joint at its base portion by which neighboring struts are connected with each other such that the struts are pivotable to each other when the lying structure is in an unconnected state, in which the lying structure is not connected to the two main rods.

8. The stretcher according to claim 4, wherein the two main rods and/or the one or more crawler chain structures are made from metal, polymer, carbon fiber material and/or mixtures thereof.

9. The stretcher according to claim 1, wherein the lying structure is in an unconnected state and comprises a plurality of struts, in which the lying structure is not connected to the two main rods, inflexible along a transverse direction along which the struts extend and flexible along the thereto perpendicular longitudinal direction.

10. The stretcher according to claim 1, wherein each main rod comprises a telescopic mechanism, which is configured for moving the main rod between the contracted position and the extended position.

11. The stretcher according to claim 1, wherein each main rod comprises a plurality of concentrically arranged cylindrical elements which can in the contracted position be slid into each other.

12. The stretcher according to claim 1, wherein each of the two main rods consists of two half rods, wherein the two half rods are releasably connected with each other at their distal ends to form the main rod.

13. The stretcher according to claim 12, wherein the two half rods are releasably connected with each other by a bayonet joint, a snap on connection or a threaded connection.

14. The stretcher according to claim 1, wherein the stretcher further comprises two or more transversal rods being each releasably connected to the two main rods.

15. The stretcher according to claim 1, wherein each of the two main rods can be pretensioned in the contracted position such that each of the two main rods can be released and moved into the extended position by activating an activation button on each respective main rod.

16. The stretcher according to claim 1, wherein the lying structure is releasably connected to each of the two main rods by a force locking connection and/or a form locking connection.

17. The stretcher according to claim 1, wherein the lying structure further comprises a textile or foam.

18. The stretcher according to claim 1, wherein the lying structure is in an unconnected state, in which the lying structure is not connected to the two main rods, configured such that it can be coiled into a coil.

19. A method for assembling a stretcher according to claim 1, wherein the lying structure is connected to the two main rods and wherein optionally the two main rods are each first assembled by connecting two half rods prior to connecting the lying structure to the two main rods.

20. A kit of parts configured for being assembled into a stretcher according to claim 1, the kit comprising:
   a. two main rods, wherein each main rod is movable along a longitudinal direction between a contracted position and an extended position; and
   b. a lying structure being releasably connectable to each of the two main rods.

21. A stretcher for transporting individual(s), the stretcher comprising:
   a. two main rods, wherein each main rod is movable along a longitudinal direction between a contracted position and an extended position; and
   b. a lying structure being releasably connected to each of the two main rods and comprising a plurality of struts, wherein the lying structure is in an unconnected state, in which a lying structure is not connected to the two main rods, inflexible along a transverse direction along which the struts extend and flexible along the thereto perpendicular longitudinal direction.

22. A stretcher for transporting individual(s), the stretcher comprising:
   a. two main rods, wherein each main rod is movable along a longitudinal direction between a contracted position and an extended position; and
   b. a lying structure being releasably connected to each of the two main rods, wherein each of the two main rods can be pretensioned in the contracted position such that each of the two main rods can be released and moved into the extended position by activating an activation button on each respective main rod.

* * * * *